United States Patent [19]

Barton, Jr.

[11] Patent Number: 5,182,885
[45] Date of Patent: Feb. 2, 1993

[54] EXTENDABLE WALL SLEEVES

[75] Inventor: Bruce G. Barton, Jr., Whitmore Lake, Mich.

[73] Assignee: Thunderline Corporation, Belleville, Mich.

[21] Appl. No.: 645,805

[22] Filed: Jan. 25, 1991

[51] Int. Cl.⁵ .............................................. E04G 15/00
[52] U.S. Cl. .......................................... 52/98; 52/576; 52/577; 249/43; 249/83; 249/155; 138/155; 285/4; 285/298; 285/303
[58] Field of Search ................. 285/3, 21, 4, 298, 303; 52/98, 100, 576, 577; 138/121, 155; 249/39-43, 150-157, 160, 164, 165, 167, 83

[56] References Cited

U.S. PATENT DOCUMENTS

| | | | |
|---|---|---|---|
| 1,783,605 | 12/1930 | Della | 285/4 |
| 3,867,804 | 2/1975 | Wilson | 52/99 X |
| 3,905,845 | 4/1974 | Santoro | 138/155 X |
| 4,211,259 | 7/1980 | Butler | 138/155 X |
| 4,296,157 | 10/1981 | Conti | 138/121 |
| 4,625,940 | 12/1986 | Barton | |

Primary Examiner—Richard E. Chilcot, Jr.
Assistant Examiner—Robert Canfield
Attorney, Agent, or Firm—Kinzer, Plyer, Dorn, McEachran & Jambor

[57] ABSTRACT

A one-piece, unitary, molded resin wall sleeve precursor has two cup-shaped end sections of external diameter D1 each having a hollow transition section of enlarged diameter that connects the end section to a sleeve of internal diameter D1; one transition section has an outer diameter D2 and the other has an inner diameter just slightly larger than D2. D2 is appreciably larger than D1. A wall sleeve assembly of extended length is derived from two of these precursor members by cutting off the end sections; the precursor members can then be joined with a strong, inexpensive, welded joint to afford a long wall sleeve of consistent internal diameter.

10 Claims, 1 Drawing Sheet

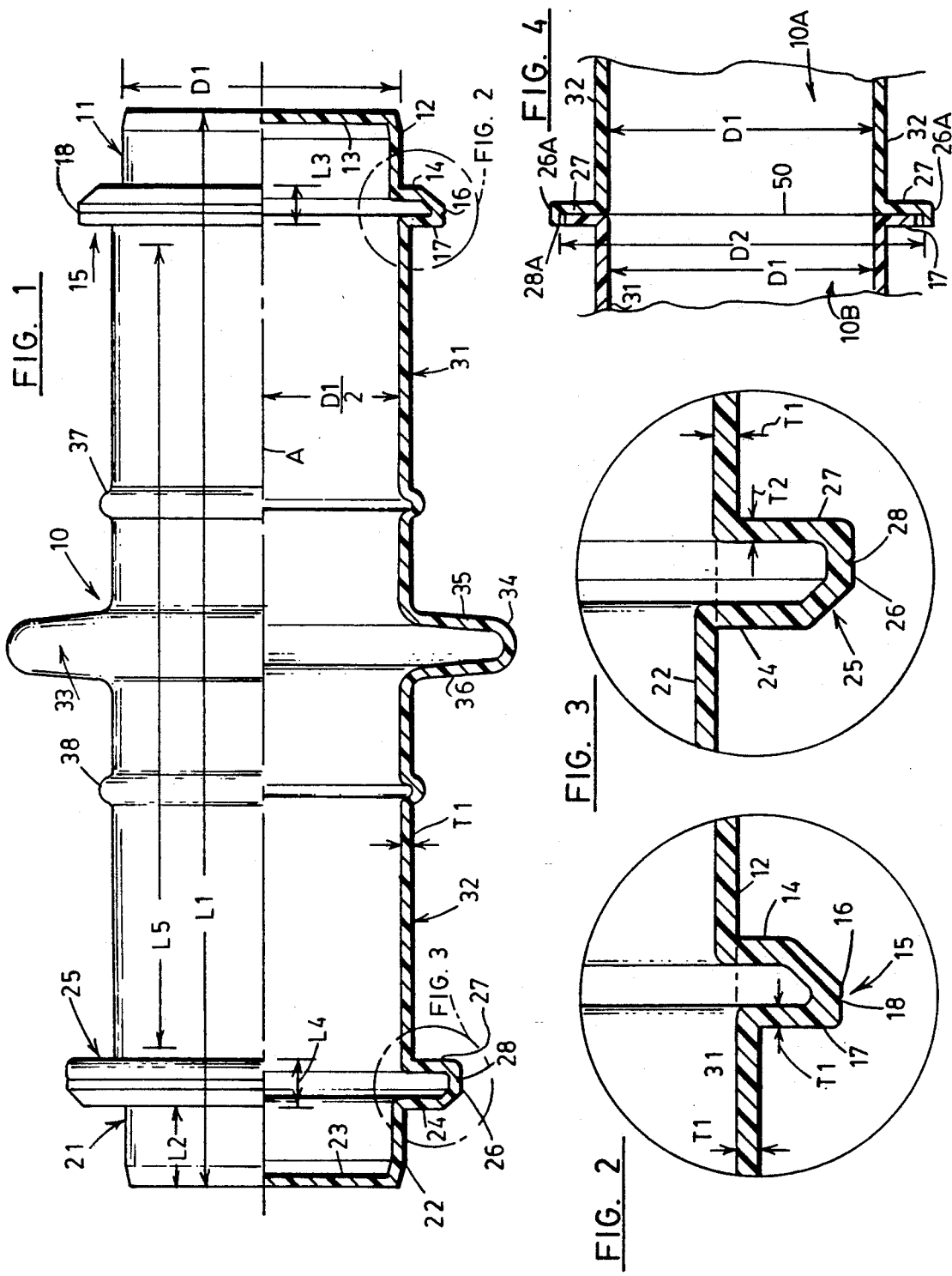

EXTENDABLE WALL SLEEVES

BACKGROUND OF THE INVENTION

In new construction, whether for commercial, residential, industrial, bridge, road, or other uses, it is often necessary to extend a pipe or conduit for water, gas, electrical line, etc. through a wall, or a floor. Furthermore, it is frequently desirable or even mandatory to provide a hydrostatic seal around the pipe or conduit to preclude seepage of water or other fluid through the wall or floor. The most practical and effective seal construction for applications of this kind, in most instances, is an expansion seal formed of a series of interleaved blocks of rubber or other elastomer interconnected by a sequence of pressure plates, with a plurality of bolts extending between the pressure plates; the bolts are tightened to squeeze the elastomer blocks between the pressure plates, expanding the blocks to form a continuous hydrostatic seal around the periphery of the pipe. A preferred construction for a wall seal closure of this kind is described and claimed in U.S. Pat. No. 3,528,668 of Bruce G. Barton. Other wall closure seal constructions for forming peripheral seals on pipes and conduits are also known in the art.

To assure an effective seal, in applications of this kind, it is highly desirable and often necessary to form an opening in the wall or floor, through which the pipe or conduit can extend, with an internal diameter large enough to afford an essentially symmetrical annular space between the pipe and the opening. The diameter of the wall opening may vary to a substantial extent, depending upon the outside diameter of the pipe or conduit and the particular seal to be used. Thus, the internal diameter required for the wall opening may range from under two inches up to two feet or more. For most construction of this kind, particularly in a concrete wall, a wall sleeve extending through the concrete is employed.

One practical and effective wall sleeve construction that has seen widespread use in applications of this kind is a metal tube having a length equal to the width of the wall and having a metal ring welded to the outside central portion of the metal sleeve. The metal ring serves as a water stop to preclude water seepage along the outer surface of the sleeve, at the interface between the sleeve and the concrete wall. The ring also serves as an anchor to preclude axial movement of the wall sleeve relative to the wall. This metal sleeve construction, however, presents difficult technical problems of a continuing nature relating to accurate location of the sleeve, prevention of entry of concrete or debris into the sleeve, and the need to maintain a substantial inventory of sleeves of differing lengths; the wide variations in wall width and in required sleeve diameter produce too many combinations for economical storage. Further, corrosion and sleeve weight are continuing problems.

Another advantageous wall sleeve construction, one which effectively overcomes many of the disadvantages of steel wall sleeves, is disclosed in U.S. Pat. No. 4,625,940 of Bruce G. Barton. That wall sleeve construction starts with a molded resin precursor having cup-like end cap sections of an outside diameter D formed integrally with the opposite ends a main sleeve section having an inside diameter D; the end cap sections are ends of the main sleeve section by hollow transition sections of larger diameter. In use, the end caps are cut off the main sleeve and mounted in a concrete form, with the sleeve section slipped into the two cap sections. When the wall has been poured and set, the end caps are removed along with the form walls, leaving a wall sleeve suitable for use with a conduit and expandable seal, as described above.

The wall sleeve precursors of U.S. Pat. No. 4,625,940 can be used to produce a wall sleeve longer than an individual precursor by cutting off the end wall of a cap section on one sleeve precursor and inserting it into the end of another precursor from which the complete cap section has been removed. But the resulting extended length sleeve leaves much to be desired. At best, if the two precursors are joined by a thermal weld (it is quite difficult to form such a weld joint) there is a ridge inside the joint and an appreciable length of a reduced diameter within the sleeve. The joint is not usually as strong as desired. Usually, auxiliary fasteners such as self-tapping screws are needed, with messy external sealant needed. More importantly, the screws or other fasteners project into the sleeve and create an appreciable obstruction in it. Moreover, the labor expense is substantial, and scrap is usually undesirably high. The present invention is an improvement on that of the Barton U.S. Pat. No. 4,625,940.

SUMMARY OF THE INVENTION

It is a principal object of the invention, therefore, to provide a new and improved unitary, one-piece molded resin construction for a wall sleeve precursor that can be readily and inexpensively converted into an improved wall sleeve assembly of extended length, using plural precursors, an assembly that can be used to form a passageway of consistent internal diameter through a concrete wall of virtually any thickness, although the assembly provides strong sealed joints between adjacent sleeve sections, with minimal scrap.

A further object of the invention is to provide a new and improved unitary, one-piece molded resin wall sleeve precursor that can be joined to other such precursors to form a wall sleeve assembly that affords a passageway of consistent internal diameter through a wall, that eliminates any need for screws or other fasteners, and that minimizes labor costs.

Accordingly, the invention relates to an improved construction for a unitary, one-piece molded resin wall sleeve precursor convertible into a wall sleeve assembly that forms a continuous unimpeded passageway of consistent internal diameter $D1$ through a concrete wall by cutting off end sections and transition sections from the outer ends of sleeve sections of central sleeve members of each of two or more precursors and joining the sleeve members to each other, the precursor comprising: first and second end sections, each end section including a cylindrical body portion having an external diameter $D1$ and a substantially flat mounting flange projecting radially outwardly of the axially inner end of the body portion of the end section; and first and second transition sections joining the first and second end sections, respectively, to opposite ends of a central sleeve member, each transition section including an outer transition wall extending axially inwardly from the outer rim of the mounting flange of its end section and a substantially flat transition boundary wall extending radially inwardly from the outer transition wall to the central sleeve member. The transition wall of the first transition section has an outer diameter $D2$ and the transition wall of the second transition section has an inner diameter D2, with D2>D1.

In another aspect, the invention relates to a cylindrical wall sleeve assembly for forming an unimpeded passageway of consistent internal diameter D1 through a concrete wall of given width W, comprising:

a first unitary one-piece cylindrical molded resin sleeve member having an internal diameter D1, a joint end of the first sleeve member terminating in a substantially flat radial flange having an external diameter D2, with D2>D1; and a second unitary one-piece cylindrical molded resin sleeve member having an internal diameter D1, a joint end of the second sleeve member terminating in a substantially flat radial flange having an axially projecting outer rim with an internal diameter D2;

the joint ends of the first and second sleeve members are firmly secured to each other with their radial flanges in abutting engagement to afford an assembled sleeve having an overall length L approximately equal to the wall width W.

There are a pair of end members, each end member including a cylindrical body having a external diameter D1 to fit tightly into an open end of the assembled sleeve, each end member further having a substantially flat radially outwardly projecting mounting flange at its outer end which limits insertion of the end member into the sleeve; the end member flanges comprise mounting means for mounting the assembly in fixed position between the opposed walls of a concrete form while allowing removal of both end members, upon dismantling of the form, for full exposure of the interior of the sleeve.

BRIEF DESCRIPTION OF THE DRAWINGS

FIG. 1 is a partially sectional side elevation view of a unitary, one-piece rotationally molded resin wall sleeve precursor comprising one embodiment of the present invention;

FIGS. 2 and 3 are detail sectional views, on an enlarged scale, of the portions in circles 2 and 3 of FIG. 1 respectively; and FIG. 4 is a detail elevation view, in cross section, illustrating how one end of one wall sleeve precursor of FIG. 1 is joined to an end of another such wall sleeve assembly.

DESCRIPTION OF THE PREFERRED EMBODIMENTS

FIG. 1 illustrates a unitary, one-piece molded resin wall sleeve precursor 10 comprising a preferred embodiment of the present invention; the precursor 10 is convertible into a wall sleeve assembly for forming a passageway of consistent internal diameter D1 through a concrete wall. Moreover, a part of precursor 10 can be joined to parts of other such precursors to afford a wall sleeve of virtually any length that has the same, consistent internal diameter throughout its length.

The wall sleeve precursor 10 includes first and second end sections 11 and 21. The first end section 11 includes a cylindrical body portion 12 having an external diameter D1. The body portion 12 has an outer end wall 13 closing off its outer end, so that end section 11 has a cup-shaped configuration. The axially inner end of the body portion 12 of end section 11 comprises a mounting flange 14 that projects radially outwardly to a diameter larger than D1. The second end section 21 of precursor member 10 is of corresponding construction, including a cylindrical body 22 closed by a end wall 23 and having an outwardly projecting mounting flange 24 at its axially inner end. Walls 13 and 23 may have a centered alignment aperture (not shown) as described in the aforementioned U.S. Pat. No. 4,625,940.

Proceeding axially inwardly from the end section 11, wall sleeve precursor 10 comprises a first transition section 15. This first transition section 15 includes a cylindrical outer transition wall 16 that extends axially inwardly from the outer rim of the mounting flange 14 on end section 11 first at a 45° angle to and then parallel to the sleeve axis A. The transition wall 16 merges into a substantially flat transition boundary wall 17 that extends radially inwardly. There is an annular groove 18 in the outer surface of transition 16 as shown in enlarged detail in FIG. 2.

Groove 18 may be continuous, as shown in FIG. 1, or it may be intermittent. Groove 18 is displaced axially outwardly of the external surface of the transition boundary wall 17 by a distance slightly larger than the wall thickness T1.

Adjoining end section 21, at the opposite end of the wall sleeve precursor 10, there is a second transition section 25 that includes a cylindrical outer transition wall 26. The transition wall 26 extends axially inwardly, from the outer rim of the flat mounting flange 24 of end section 21, initially at an angle of 45° and then parallel to sleeve axis A. There is an annular groove 28 in the outer surface of transition wall 26. Transition wall 26 ends with a substantially flat transition boundary wall 27 that extends radially inwardly, toward axis A. FIG. 3 affords an enlarged view of transition section 25 and groove 28 which, like groove 18, can be continuous or intermittent. Groove 28 is spaced axially outwardly of the external surface of transition boundary wall 27 by a distance of approximately twice the wall thickness T2.

The wall sleeve precursor 10 of FIG. 1 further comprises two sleeve sections 31 and 32, each having an internal diameter D1; the sleeve sections are interposed in series between the two transition sections 15 and 25. Sleeve sections 31 and 32 are interconnected by a hollow water stop section 33. The water stop section 33 includes two spaced walls 35 and 36 that extend radially outwardly of the inner ends of the sleeve sections 31 and 32; walls 35 and 36 are interconnected by a water stop rim wall 34. As is clearly shown in FIG. 1, the internal diameter of the water stop rim wall 34 is much larger than the internal diameter D1 of the sleeve sections 31 and 32.

If more than one water stop is desired, an additional sleeve section and another water stop section can be added to precursor member 10. For N sleeve sections like sections 31 and 32 there should be N−1 water stop sections like section 33. In most instances a single water stop is adequate; thus, it is typical that N=2.

Sleeve section 31 may include an annular external reinforcing rib 37; a similar external reinforcing rib 38 can be provided in sleeve section 32. Ribs 37 and 38 are of hollow construction, each being substantially smaller in diameter than water stop section 33.

Perhaps the most practical method for manufacturing the wall sleeve precursor 10 of FIG. 1 is rotational molding. The precursor member should be formed of a non-corrosive resin; a thermoplastic resin is suitable for most situations, though a thermoset resin may be desirable in applications where high heat levels may be encountered (e.g., steam pipes). The internal diameter D1 of member 10 is dependent upon the application and may range from less than two inches up to two feet or more. For a two inch diameter D1, the wall thickness T may be approximately 0.125 inch whereas for a diameter D1 of two feet the wall thickness T should be materially increased, preferably to 0.25 inch or more. For smaller sleeve diameters the reinforcing ribs 37 and 38 may be omitted; preferably, however, they are used for all sizes. While a variety of different resins may be employed, high density polyethylene has been found to be satisfactory for most applications.

Typically, the overall length L1 of the wall sleeve precursor member 10 may be about 20.625 inches. A suitable length L2 for each of the end sections 11 and 21 is 1.5 inches. The axial lengths L3 and L4 for the transition sections 15 and 25, respectively, vary somewhat, with L4 slightly larger than L3. Typically, L3 may be 0.155 for a wall sleeve of two inch inside diameter up to 0.28 inch or more for a large wall sleeve, such as two feet inside diameter. A corresponding range for L4 is about 0.75 to 1.0 inch.

The effective usable sleeve length L5, after transition sections 15 and 25 have been cut off, is approximately 15.5 inches. This length L5 is adequate for the great majority of concrete walls and floors requiring wall sleeves, regardless of variations in the required diameter D for such sleeves. Thus, with the specified dimensions the wall sleeve precursor member 10 can be converted into a complete, unitary wall sleeve assembly adaptable to the great majority of jobs. In this respect, precursor 10 is quite equivalent to the wall sleeve precursor of U.S. Pat. No. 4,625,940. On the other hand, the sleeve length can be extended for walls of unusually large width as described in connection with FIG. 4, with marked advantages over the prior wall sleeve precursor.

FIG. 4 illustrates how a wall sleeve assembly of extended length is formed from two wall sleeve precursors 10A and 10B corresponding in construction to precursor 10 of FIG. 1. In the arrangement illustrated in FIG. 4, the right-hand precursor 10A includes the sleeve section 32 and ends with the substantially flat transition boundary wall 27 that projects radially outwardly from sleeve 32. A portion of the transition section rim wall 26A extends in an axial direction from the radial transition boundary wall 27 but has been cut off at the groove or notch in the transition wall, as indicated at 28A.

In the portion of a wall sleeve assembly illustrated in FIG. 4, precursor 10B includes the end of its sleeve section wall 31 and the radially outwardly projecting substantially flat transition boundary wall 17. The wall or transition 17 has an outer diameter D2 that is appreciably larger than the internal sleeve diameter D1. The internal diameter of the mating transition wall 26A bf the other precursor 10A is at least as large as diameter D2 so that, as shown in FIG. 4, transition wall 26A fits entirely over the outer rim of flange 17. This makes it possible to utilize a thermal welding technique, as generally indicated at 50 in FIG. 4, around the entire periphery of the transition boundary walls 17 and 27 to form a strong, sealed joint between those walls.

The wall sleeve joint construction shown in FIG. 4, utilized to form a wall sleeve assembly of extended length from two of the precursors 10, has several appreciable advantages as compared with previously known constructions. To begin with, no screws or other fasteners are required. Skilled work is not necessary; cutting the precursors along the lines defined by notches 18 and 28 (FIG. 1) produces the configuration illustrated in FIG. 4. The internal diameter D1 is the same throughout the joint, without the steps inherently presented in previously known constructions. The joint shown in FIG. 4 is quite strong, with shear forces on the sleeve assembly adequately provided for. The overall joint illustrated in FIG. 4 is essentially self-aligning, again minimizing the contribution required of skilled labor. The thermal weld 50 can be formed while the sleeves are supported on molded surfaces, and leakage following the welding process is almost non-existent. Scrap is effectively reduced to a minimum. An extended sleeve of up to 27 inches, assuming the dimensions set forth above, can be made by utilizing by-product scrap plus one molded precursor where two complete precursors were previously required.

Of course, overall sleeve length can be adjusted by cutting off one end of a sleeve section 32 or 33, the ends of the sleeve sections are closed off by inserting end sections 11 and 12 into the ends of the sleeve sections, and mounting the wall sleeve assembly in a concrete form is effected by utilizing mounting flanges 14 and 24, all as described in the earlier Barton U.S. Pat. No. 4,625,940.

I claim:

1. An improved construction for a unitary, one-piece molded resin wall sleeve precursor convertible into a wall sleeve assembly that forms a continuous unimpeded passageway of consistent internal diameter D1 through a concrete wall by cutting off end sections and transition sections from outer ends of sleeve sections of central sleeve members of each of two or more precursors and joining the sleeve members to each other, the precursor comprising:

first and second end sections, each end section including a cylindrical body portion having an external diameter D1 and a substantially flat mounting flange projecting radially outwardly of the axially inner end of the body portion of the end section;

and first and second transition sections joining the first and second end sections, respectively, to opposite ends of a central sleeve member, each transition section including an transition wall extending axially inwardly from an outer rim of the mounting flange of its end section and a substantially flat transition boundary wall extending radially inwardly from the outer transition wall to the central sleeve member;

in the improved construction, the transition wall of the first transition section has an outer diameter D2 and the transition wall of the second transition section has an inner diameter at least equal to D2, with D2 > D1.

2. A wall sleeve precursor according to claim 1 in which:

the mounting flange of the first transition section has a wall thickness T1; and the outer surface of the transition wall of the first transition section has a groove displaced axially outwardly of the external surface of the mounting flange of the first transition section by a distance slightly larger than T1.

3. A wall sleeve precursor according to claim 2 in which the groove in the transition wall of the first transition section is annular, continuous around the transition wall.

4. A wall sleeve precursor according to claim 1 in which:

the mounting flange of the second transition section has a wall thickness T2; and the outer surface of the transition wall of the second transition section has a groove displaced axially outwardly of the external surface of the mounting flange of the second transition section by a distance larger than T2.

5. A wall sleeve precursor according to claim 4 in which the groove in the transition wall of the second transition section is annular, continuous around the transition wall.

6. A wall sleeve precursor according to claim 5 in which the axial outward displacement of the groove from the external surface of the mounting flange is approximately twice T2.

7. A wall sleeve precursor according to claim 6 in which:

the mounting flange of the first transition section has a wall thickness T1; and the outer surface of the transition wall of the first transition section has a groove displaced axially outwardly of the external surface of the mounting flange of the first transition section by a distance slightly larger than T1.

8. A cylindrical wall sleeve assembly according to claim 1 in which:

the first mounting flange has a thickness T1;

the second mounting flange has a thickness T2 approximately equal to T1;

the outer surface of the transition wall of the first transition section has a groove displaced axially outwardly of the external surface of the first mounting flange by a distance slightly larger than T1; and the outer surface of the transition wall of the second transition section has a groove displaced axially outwardly of the second mounting flange by a distance of approximately twice T1.

9. A wall sleeve precursor according to claim 8 in which each of the transition wall grooves is annular and continuous around the transition wall.

10. A cylindrical wall sleeve assembly for forming an unimpeded passageway of consistent internal diameter D1 through a concrete wall comprising:

a first unitary one-piece cylindrical molded resin sleeve member having an internal diameter D1, a joint end of the first sleeve member terminating in a substantially flat radial flange having an external diameter D2, with $D2 > D1$;

a second unitary one-piece cylindrical molded resin sleeve member having an internal diameter D1, a joint end of the second sleeve member terminating in a substantially flat radial flange having an axially projecting outer rim with an internal diameter of at least D2;

the joint ends of the first and second sleeve members being firmly secured to each other with their radial flanges in abutting engagement to afford an assembled sleeve;

and a pair of end members, each end member including a cylindrical body having an external diameter D1 to fit tightly into an open end of the assembled sleeve, each end member further having a substantially flat radially outwardly projecting mounting flange at its outer end which limits insertion of the end member into the sleeve, the end member flanges comprising mounting means for mounting the assembly in fixed position between the opposed walls of a concrete form while allowing removal of both end members, upon dismantling of the form, for full exposure of the interior of the sleeve.

* * * * *